Patented June 28, 1949

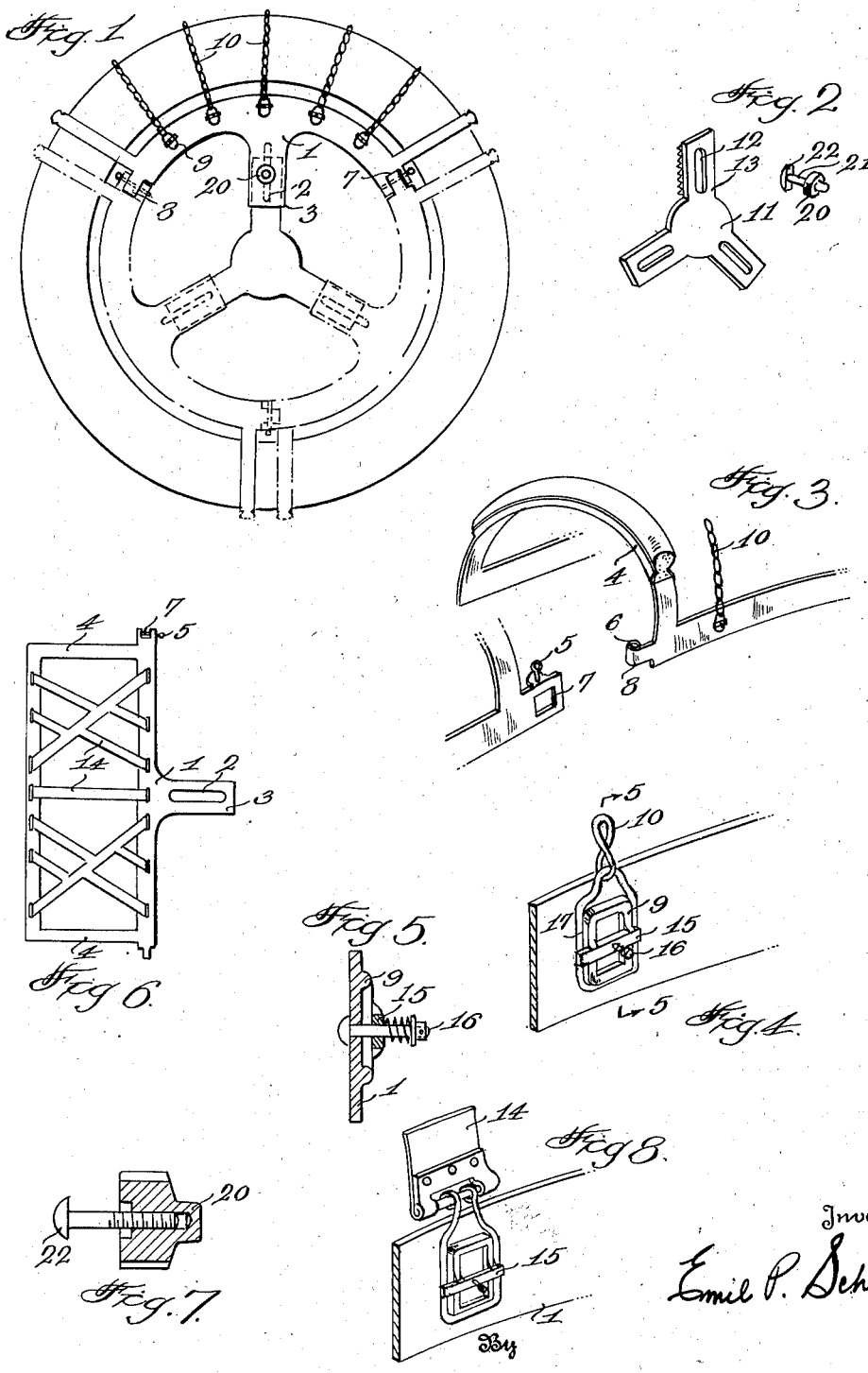

2,474,696

UNITED STATES PATENT OFFICE 2,474,696

ANTISKID TRACTION APPLIANCE FOR MOTOR VEHICLE WHEELS

Emil P. Schwab, Mount Lebanon, Pa.

Application February 11, 1947, Serial No. 727,888

6 Claims. (Cl. 152—223)

The object of this invention is to provide a new and improved traction increasing device and appliance, which when attached to pneumatic tires of motor vehicles of any of the various types, affords effective protection against skidding and provides increased traction in a much more efficient manner than is available with appliances presently in use.

Specifically, it embodies features that permit its mounting from the outer side of the vehicle wheel, more expeditiously than any known device, as all fastening members are on the outer side. It can be attached without raising the wheel with a jack, by mounting two circumferentially disposed frame members, fastening to central member, driving vehicle forward or backing slightly, then attaching the third frame member.

Another object is to provide a device so constructed, as to have no member that must completely encircle the tire and rim of the wheel and therefore the device is capable of attachment on a solid wheel having no opening in the disc between the hub and rim of the wheel.

The circumferentially disposed frames are equipped with means for manual attachment of interchangeable traction members of the most suitable type for the particular roadway conditions encountered.

The transversely disposed convex end segments of the arcuate frame members, with resilient friction creating material attached thereto, reduce lateral sway, provide a stability and more satisfactory riding with less jolting and jouncing, in combination with either the ordinary cross chains or the diagonally or obliquely disposed rigid traction members, than is evident in devices presently in use.

The design affords a method of securely fastening the traction device to the tire, and conforming to the contour and size of the wheel, circumferential adjustment in mounting is unnecessary and suitable adaptation assured.

The interlocking arrangement holds frame members in position, prevents overlapping, avoids loosening during operation and contributes toward the elimination of slipping around the wheel.

Breakage of one or several of the traction members such as cross chains, does not affect the firmness or rigidity of the device and the remaining traction members can function effectively, until damaged or broken members are repaired or replaced.

The appliance can be readily detached or removed by a person facing the outer side of wheel, without loosening any fastenings on the inner side of the vehicle wheel.

Other objects and advantages of the invention will become manifest from the following specification and accompanying drawings wherein:

Figure 1 illustrates a wheel with one form of the device attached to it.

Figure 2 shows in perspective the central member and one of three bolts used with it.

Figure 3 is a fragmentary perspective view showing portions of two frames and method of interlocking them.

Figure 4 is a fragmentary view of a frame with means for attaching a cross chain to it.

Figure 5 is a detail sectional view of the chain locking arrangement.

Figure 6 is a plan view of frame with rigid traction members.

Figure 7 is a detail view of bolt and nut of Figure 2, the nut being in section.

Figure 8 is a fragmentary perspective view of a portion of the structure of Figure 6.

Referring to the drawings wherein like numerals designate like parts, it will be observed that in the complete assembly in Figure 1, the conventional tire is denoted by "T." Parts 10 correspond with ordinary "cross chains" to provide additional traction. These chains are fastened to frames 1, here shown as three in number, interlocked to form a complete circular unit. Each frame has a pair of parallel arcuate portions joined near their ends by arched portions 4 of proper shape and size to conform to the surface of the particular size of tire the device is intended to fit.

A radial portion 3 at the middle of each outer arcuate portion complements one of the legs 13 of a spider 11, and the four parts are assembled into a single structure by means of bolts 20. The arcuate portions 4 are also utilized like the cross chains to give traction, the edges being turned in a little, as seen in Figure 3, to engage grooves in a rubber strip 4a.

Method of interlocking of the arcuate portions is also shown in Figure 3. The left end of one frame has a tongue rolled over as at 8 to form both a hook which can be engaged in opening 7 of the right end of the adjacent frame and a socket 6 to align with holes in tabs 5a and to be firmly locked by pin 5.

Edges of the radial portions 3, Figure 1, are bent over to form channels in which the legs 13 of the spider 11 can slide, with slot 2 in line with slot 12, Figure 2, of the spider. The center of the spider may have a spherical curvature to conform with the usual shape of wheel hub covers, and the arms have transverse ribs or corrugations 11a in which the flanged ends of members 3, Figure 1, fit selectively when the spider is centered on the frames.

As seen in Figures 2 and 7, the fastening bolt 21 has a T-head 22 which can be passed lengthwise through slots 2 and 12 and then turned at right angles for engagement.

The nut 20 is of the cap type to cover the threaded end of the bolt and its lower end has a cylindrical surface that may be milled or ridged to give good friction for tightening and loosening. The T-head is of cylindrical curvature in section to merge smoothly toward the adjacent surfaces.

Figures 4 and 5 illustrate the preferred method of holding the cross chains on the frame. Spaced at proper intervals along the side members are thickened portions 9, which serve to receive and hold the collars 17, Figure 4, which terminate the cross chains 10. Bars 15 can be turned on the shanks of bolts 16 by pulling out against resistance of coiled springs to admit the collars, and locked again by letting the bars engage abutments formed on members 9 as best seen in Figure 4.

An optional modification of the frame and cross chain arrangement is shown in Figures 6 and 8. The arcuate side members of the frame are connected by arched members 4 at the ends, as previously described, but the cross chains are replaced by a middle bar 14 and a pair of rigid traction members 14a. Each traction member has one long diagonal strip with a pair of shorter strips on each side as seen in Figure 6. It will be noted that the short strips on one side of the long diagonal strip join the latter in staggered relation to the short strips on the other side.

The method of attachment of these rigid traction members is similar to that used for attachment of the cross chains; but collar 17a, Figure 8, instead of having a loop to receive a chain link, is bent over to form one leaf of a hinge, the other leaf of which is formed at the end of the traction member.

Figure 6 shows a frame having seven locking devices, on each side, such as are seen in Figure 8; but as in the case of the cross chains of Figure 1, the number can be changed as desired.

It will be observed that the nature of the invention is such that construction with metal will be most satisfactory, although certain portions thereof may adapt themselves to plastics.

It is not contemplated by the specifications and drawings to restrict the invention to specific sizes or exact shapes, but rather to illustrate the principles expounded. As an example the hub or central fastening member in Figure 2 is also representative of one with two or four legs depending upon the number of circumferentially disposed frame structures that comprise the complete circular unit and it can also be considered as being representative of any hub arrangement whether spherical or merely a disc with longer or shorter legs or for direct fastening of radial portions 3, Figures 1, of appropriate design.

It is believed that the design and advantages of the device are manifest, that details become evident with the foregoing explanations and complementary drawings, and that a further outline is therefore unnecessary.

However, it should be stated that while the preferred embodiment of the invention has been disclosed, it is understood that minor changes in the details of construction, combination and arrangement of the embraced parts is considered as being within the scope claimed without departing from the intent and purpose of the invention.

Having thus described the invention, what I claim as new is:

1. In an anti-skid and traction device or improvement thereof, for motor vehicle wheels, of the described class, convex and elongated rigid frames adapted to be applied to the tread of a tire and extend lengthwise circumferentially thereof, the transversely disposed segments fitted with resilient material, with outer-side frame interlocking means, individual radial portions extending from each of the outer-side plates, a central spider or hub member embodying a rigid round disc or circular center that may be of spherical curvature to conform to the shape of wheel hub covers, with projecting slotted legs, the edges of said legs having transverse ribs or corrugations in which flanged ends of complementary radial portions fit selectively, and means for fastening these members together.

2. In an anti-skid and traction device for motor vehicle wheels of the described type, comprising arcuate, convex, elongated rigid frames, with resilient material fitted in transversely disposed traction members, outer-side frame interlocking means, individual slotted radial portions extending from each of the outer arcuate side plates, formed for receiving slotted legs of a central spider member, through which slots a T-head fastening bolt can be passed lengthwise and then turned so that it is at right angles for engagement, said bolt being provided with a cap type nut to cover the threaded end of the bolt, its lower end having cylindrical surface that may be milled or ridged to give good friction for tightening.

3. An anti-skid and traction device for motor vehicle wheels, of the type described, comprising arcuate, longitudinal and circumferentially disposed rigid frames with interlocking means, transversely disposed convex segments forming traction members near both extremities of frames, fitted with resilient material, radial portions extending from the outer arcuate segments of frames, a central hub member with projecting legs and means for fastening to said radial portions, to securely hold frame structures to the wheel.

4. An improvement in anti-skid and traction appliances for motor vehicle wheels of the type described, embodying elongated rigid frames adapted to be applied to the tread of a tire to extend lengthwise circumferentially thereof, said frames comprising a pair of parallel arcuate portions, joined near both extremities by transversely disposed convex segments forming traction members, with resilient friction material securely attached by curvature indentation commencing near base thereof, frame interlocking means, radial portions extending from outer-side arcuate segments and additional means for joining frames on outer-side and firmly attaching them to the wheel, comprising a central spider member, with means for fastening to the described radial portions.

5. An improvement in anti-skid and traction appliances for motor vehicle wheels of the type described, comprising arcuate, elongated rigid frames, adapted to be applied to the tread of the tire to extend lengthwise circumferentially thereof, transversely disposed traction members fitted with resilient material forming part of said frames, near the ends thereof, frame interlocking means consisting of a tongue rolled over to form a hook, which can be engaged in a complementary opening near the outer right extremity of the adjacent frame, a socket to align with hole in tab and pin for firm locking.

6. In an anti-skid and traction device for motor vehicle wheels, of the described class, comprising rigid frames adapted to be applied to the tread of a tire to extend lengthwise circumferentially thereof, with transversely disposed traction members fitted with resilient material, with outer-side frame interlocking means, individual radial portions extending from each of the outer-side arcuate plates, with edges slightly bent over to form flanges, a central spider member having longitudinal slots in its projecting legs, complementary to similar slots in the described radial portions, with the flanged edges thereof designed for receiving the projecting legs of said spider member, and the slots provided to permit T-head fastening bolt to be passed through and turned to right angles for engagement and fastening with a nut.

EMIL P. SCHWAB.

REFERENCES CITED

The following references are of record in the file of this patent:

UNITED STATES PATENTS

| Number | Name | Date |
|---|---|---|
| 1,001,633 | Gaylor | Aug. 29, 1911 |
| 1,101,198 | Lashar | June 23, 1914 |
| 1,206,504 | Bishop | Nov. 28, 1916 |
| 1,334,845 | Dulac | Mar. 23, 1920 |